3,000,901
DEHYDRATION OF PENTAERYTHRITOL
Joseph A. Wyler, Blooming Grove, Pa., assignor to Trojan Powder Company, Allentown, Pa., a corporation of New York
No Drawing. Filed May 4, 1959, Ser. No. 810,556
7 Claims. (Cl. 260—333)

This invention relates to dehydration of pentaerythritol, to novel and improved processes for accomplishing this dehydration, and to novel compositions of matter produced thereby.

The solid dehydration products of pentaerythritol are reactive materials which are particularly useful in polymer and resin synthesis. They generally have greater bodying power than pentaerythritol, producing higher viscosities under comparable conditions when employed in the preparation of alkyd resins.

If pentaerythritol is heated by itself up to temperatures of 260–280° C., or more, it will liberate water. However, the pentaerythritol appears to decompose directly into acrid gaseous products, containing water, formaldehyde, carbon dioxide, acrolein-like base, and so forth, without the buildup of any significant amount of solid products as intermediates. The pentaerythritol remaining in the heated flask develops a deep yellow to brown color, but the product is apparently not significantly dehydrated, for when it is used in alkyd synthesis, its bodying ability is about the same as that of pentaerythritol without this heat treatment. Accordingly, non-catalytic thermal treatment of pentaerythritol is ineffective to produce useful dehydration thereof.

Processes for the catalytic dehydration of pentaerythritol have been described in my prior United States patents. Thus, in U.S. Patent 2,462,047, I have described the catalytic dehydration of pentaerythritol with a mineral acid such as sulfuric acid. As there described, the primary effect of sulfuric acid on pentaerythritol is to cause the formation of higher, polycondensation polymers, by a reaction in which may be represented schematically by the following equations illustrating successive condensations of pentaerythritol molecules:

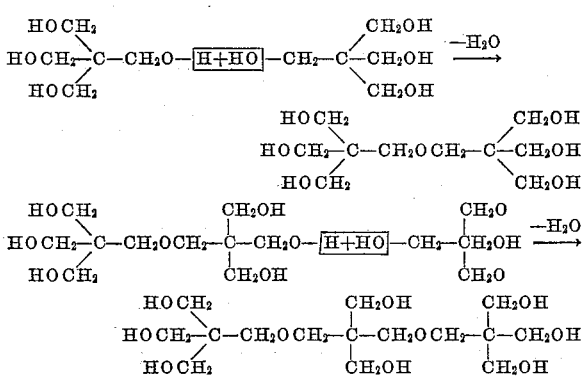

and so forth. It is to be understood that these polycondensation products may well comprise more complex molecules such as those resulting from a 1:1 condensation of two molecules of pentaerythritol with one another with the elimination of two molecules of water, and condensation of this molecule with further molecules of pentaerythritol. However, in general these polycondensation products will be substantially linear, and correspond generally to the illustrative formula

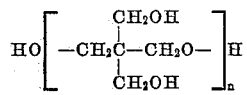

where $n$ is an integer of up to about 10.

As described in my United States Patent 2,462,048, the production of the stated linear polymers is accompanied by production of what appear to be cyclic polymers. These are believed to be derived from polymerization or condensation of pentaerythritol with an epoxy type monomer which is considered to be the initial product of dehydration of pentaerythritol. This monoether, of the formula

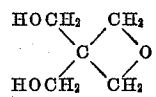

upon condensation with further molecules of pentaerythritol or self-condensation forms a cyclic polymer which may be represented by the formula

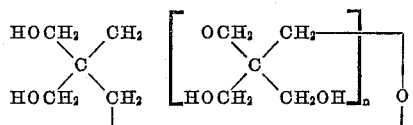

where $n$ is an integer, usually having a value of from 2 to 6. As will be seen by a comparison of this formula with that of the "linear" polymer shown above, these cyclic polymers contain one less molecule of water than the corresponding linear polymers.

Moreover, as set forth in my United States Patent 2,462,049, I have made the discovery that the dehydration of pentaerythritol can also be accomplished by the use of certain metallic salts, including stannous chloride, in the proportion of 0.3 to 10 parts per 100 parts by weight of the mixture of the said salt with pentaerythritol. As stated in this patent, the condensation product of the process there set forth is a mixture of large proportions of polypentaerythritols, that is, the stated linear or substantially linear polymer, with certain amounts of the epoxy monoether and its cyclic polymers described above.

It is desirable to minimize the degree of polymerization which occurs in the dehydration of pentaerythritol. The higher polymers of pentaerythritol, which are difficultly soluble in water or even insoluble in hot water, upon reaction with fatty acids as used in alkyd manufacture, form undesirable gelled masses, or "fish eyes," insoluble flocks, haze and even thread-like suspensions in the finished alkyd. Moreover, the stated methods for accomplishing pentaerythritol dehydration also cause the occurrence of side reactions producing double bond or aldehydic substances and colored reaction products. These are also particularly objectionable when the pentaerythritol dehydration products are employed in alkyd manufacture, since they diminish the value of the resin product by darkening its color.

In my United States Patent 2,468,722, I have described the use of an aromatic sulfonic acid for producing pentaerythritol dehydration with diminished polymerization. However, the process there described still is deficient in accomplishing the desired result of avoiding substantial polymerization of the primary pentaerythritol dehydration products.

It is an object of this invention to provide a novel process for pentaerythritol dehydration.

A particular object of this invention is to provide a process for the catalytic dehydration of pentaerythritol while avoiding substantial polymerization.

Another object of the present invention is to provide a process for the catalytic dehydration of pentaerythritol in which the catalytic effects employed are sufficiently mild that the process results in the production of compositions of matter containing low molecular weight products which have wider fields of usefulness as well as applications not found possible for previously known pentaerythritol dehydration products.

Another object is to provide a process for the dehydration of pentaerythritol without causing simultaneous formation of any appreciable proportions of double bond, aldehydic or colored substances.

An additional object is to provide a completely water-soluble pentaerythritol dehydration product.

Another object is to provide a method for the dehydration of pentaerythritol by removal of water of constitution to yield a low molecular weight product which has diminished tendency to form fish eyes, insoluble flocks, haze and thread-like suspensions in finished alkyds.

A further object is to provide a novel pentaerythritol dehydration product exhibiting bodying power equivalent to that of dipentaerythritol in certain alkyd formulations.

Another object is to provide a novel pentaerythritol dehydration product possessing enhanced bodying ability when used in alkyd manufacture.

It has now been found that if pentaerythritol, or a lower polypentaerythritol compound comprising dipentaerythritol or tripentaerythritol, is mixed with a catalyst selected from the class consisting of stannous chloride, magnesium bromide and magnesium chloride in a proportion not exceeding 0.25% by weight of the mixture, calculated on the weight of the catalyst as the hydrate thereof, and the mixture is heated to a temperature, below about 290° C., effective to liberate water of constitution of the pentaerythritol from the reaction mixture, until said water, in an amount of from about 3% to about 10% of the weight of the mixture, has been evolved from the reaction mixture, then the product obtained is a novel composition comprising low molecular weight pentaerythritol dehydration products with epoxy reactivity.

The novel compositions provided hereby are the products of the stated process. They are completely water-soluble mixtures consisting essentially of unreacted pentaerythritol (or dipentaerythritol or tripentaerythritol) starting material admixed with monomeric dehydration products thereof and water-soluble condensation and reaction products which may be derived by condensation of one molecule of the stated pentaerythritol starting material with one molecule of the stated monomeric dehydration product.

The compositions which are obtainable in accordance with the presently provided novel method are unique materials which are useful for a variety of purposes, and are particularly adapted for use in polymer and resin synthesis. They are especially adapted for use in alkyd resin synthesis, in which application they provide highly reactive bodying agents with bodying power equivalent to or greater than that of dipentaerythritol. Alkyd resins produced therefrom are remarkably free from haze, color, and gelled particles. The presently provided novel compositions may also be employed as starting materials for the manufacture of other synthetic thermosetting resins and plastics, and provide a novel source for the preparation of polymers characterized by high chemical resistance and adapted for the formation of films, fibers, and the like.

The present process is unique in producing a valuable reaction product consisting essentially of such reactive, low molecular weight dehydration products combined with the pentaerythritol starting material.

As the reaction of the process of this invention is presently understood, the reactions occurring are as illustrated by the following equations:

I. Formation of epoxy-type monoether

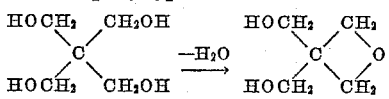

II. Formation of diepoxy-type diether

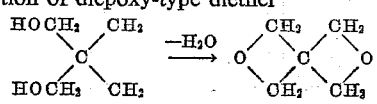

Associated with the monomeric products illustrated above, there will be condensation products which may be derived by reaction of one molecule of the pentaerythritol starting material with one molecule of the monomeric dehydration product. Interaction of the monomeric dehydration products will produce similar reaction products. Such products of 1:1 condensation and interaction of the starting material and its initial dehydration products will be characterized by a carbon atom content which is twice that of the stated monomeric materials, and may be briefly referred to as dimers. They may include, for example, dimers represented by the general but not structural formulas

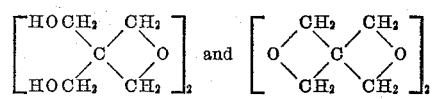

The desired course of reaction is that represented by Equations I and II, that is

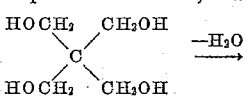

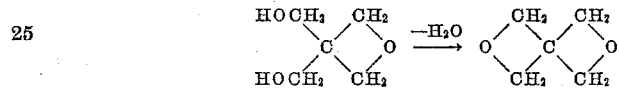

and the preferred reaction product will consist essentially of predominant amounts of the epoxy type monoether and the diepoxy type diether, associated with minor amounts of the stated cyclic dimers thereof, and unreacted starting material.

It is to be understood that the products of this invention are distinctly different from those provided by my prior processes for pentaerythritol dehydration mentioned hereinabove. In my patented processes, the catalytic effect was too powerful to produce such product. Thus, a powerful catalyst such as a mineral acid, even when used to the extent of only 0.1%, or metal salts which I have found heretofore to be useful for pentaerythritol dehydration employed as I have described in my earlier patents function in a different manner than is disclosed herein. Although the same reactions as those illustrated above may be involved in my earlier patented pentaerythritol dehydration processes as the initial step in the polymerization processes involved therein, there is a distinct and important difference in the further course of the reaction. The presently provided process proceeds to form substantial quantities of the indicated monomers, with some dimers, without producing any considerable amounts of higher polymers. In contrast, in the reaction mixtures of my earlier processes, polymerization to high molecular weight products proceeds concurrently with conversion of the pentaerythritol starting material to these initial dehydration products, so that at no time is there any substantial quantity of the monomeric or dimeric epoxy type dehydration product present in the reaction mixture. Instead, these reaction mixtures of my earlier processes comprise at most only minor amounts of the initial products of pentaerythritol dehydration, associated with the higher polymers of the stated epoxy ether and the polycondensation linear polymers of pentaerythritol. These polymers present too many reactive centers to the fatty acids and the like used in alkyd manufacture, resulting in alkyds containing gelled particles. Low OH content material present in such products of my patented processes forms a sticky, gummy material during the course of alkyd manufacture which interferes with the filtration step in alkyd processing. The double bond or aldehydic substances and colored reaction products which also accompany such previous processes cause the formation of a brownish color in the product which in turn downgrades alkyds produced from these reaction products.

On the other hand, when pentaerythritol is dehydrated in accordance with the present invention, the product obtained is low in polymerized or condensed high molecular weight material and low in aldehydic or double bond materials which are forerunners of color formation in alkyd manufacturing. It can be demonstrated to be distinctly different from those obtained by the prior art processes.

Thus, the product of the stated prior art processes contains polymers which are difficultly soluble in water or insoluble even in hot water. The product of the presently provided process is completely and readily soluble in water to form a clear, haze-free solution therein.

When the products of my earlier processes are subjected to nitration with 98% nitric acid as described in my United States Patent 2,462,048, they produce polymeric nitrates, of the nature disclosed in my United States Patent 2,465,776. The products of the present process produce no detectable amount of the polymeric nitrates mentioned above upon nitration in 98% nitric acid. Instead they produce tetranitrates, which demonstrates their substantially monomeric nature.

Simple heating of the presently provided compositions at 200° C. causes polymerization and condensation to take place without the liberation of water and without any decrease in OH content of the product.

If the total reaction product of the present process is extracted with boiling chloroform to remove the starting material, (pentaerythritol, dipentaerythritol, or tripentaetythritol), which is insoluble therein, filtered hot, and the filtrate evaporated to dryness, a viscous syrup is obtained. This syrup apparently consists largely or entirely of the cyclic monoether (and its dimer) associated with the dicyclic diether (and its dimer). If it is held at 160–200° C., for a few hours, a progressive increase in viscosity takes place without the liberation of water and without any significant change in percent of OH. The hot liquid polymerized product can be drawn out into thin tough threads resembling nylon fiber. When the product is poured onto a surface and allowed to cool and harden, it forms a film with marked chemical resistance toward water, acids and alkalies. Ordinary dilute acids do not appear to have any effect in dissolving it and it requires hot concentrated sulphuric acid to attack the film.

Apparently the product of the present reaction then, apart from unreacted starting material, consists substantially completely of low molecular weight cyclic epoxy compounds. In contrast to this, the products of the processes which I have described heretofore in my United States patents contain substantial proportions of higher polymers and do not consist largely or entirely of the starting material associated with the low molecular weight compounds.

Thus it will be clear that my new process provides a pentaerythritol dehydration product which is unique in composition and is dissimilar to those produced by processes described heretofore.

In conducting the process of this invention, it is necessary to adhere closely to the conditions given in this specification, since relatively minor deviations can cause considerable differences in the chemical composition of this product.

The starting material will comprise pentaerythritol, dipentaerythritol or tripentaerythritol; mixtures of these lower hydroxy pentaerythritol compounds may alternatively be employed if desired. The term pentaerythritol as used in this specification will be intended to cover these lower hydroxy pentaerythritol compounds as well as the monopentaerythritol alone. When it is intended to refer specifically to monopentaerythritol, this will be indicated.

The pentaerythritol will be mixed with a catalytic agent selected from the class consisting of stannous chloride, magnesium bromide and magnesium chloride, in an amount of no more than 0.25% by weight of the total mixture, calculated on the weight of the catalyst as the hydrate thereof. The upper limit on the amount of catalyst which is to be used is critical. When, for example, 0.3% is used instead of 0.25%, under parallel conditions, the product does not have the novel characteristics of the new monomeric products provided by this condition. Upon use of excess catalyst, the course and nature of the chemical reaction is altered, producing a final product which has little or no usefulness in modern alkyd resin manufacture; and producing a different course of reaction than that which is desired, which is the following reaction:

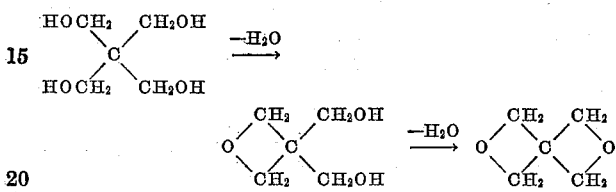

in which the liberation of a certain amount of water will correspond to a definite related lowering of the OH content of the mixture in the reaction flask, in which no significant odoriferous gases are evolved, and in no case is a yellow, water-insoluble oil driven over.

The catalysts found to be effective in accordance with the present invention will be employed in the present process ordinarily in the form of their hydrates, as they are commercially available. These constitute the dihydrates in the case of the stannous salt, and the hexahydrate in the case of each of the magnesium halides. The stated proportions of catalyst to reaction mixture refer to the proportions by weight of the respective hydrates to the mixture. The water of constitution of the hydrates may be evolved at the reaction temperature selected, and it is not essential that the salts be present in the reaction mixture as the hydrate. If desired, anhydrous salts may be employed as the catalysts in the process of this invention. In such case, the quantity employed in relation to the weight of reaction mixture will be adjusted proportionately to allow for the diminished molecular weight of the anhydrous as compared to the hydrated salts.

Usually at least about 0.01% of the catalyst will be employed, and preferably, at least about 0.025% by weight will be used. The proportion of the catalyst to be employed may vary slightly within the stated range for optimum results depending on which catalyst is selected.

The several stated catalysts vary slightly in activity. The catalytic effect of magnesium bromide is of a milder nature than that of magnesium chloride, which is particularly desirable in that less color-producing products are formed during the dehydration process. When magnesium chloride is used as the catalyst, it is not necessary to drive off quite as much water to obtain a reaction product having alkyd bodying properties equivalent to dipentaerythritol as is required with the stannous salt.

The temperature of reaction will be below about 290° C., but at least sufficient to produce liberation of water of constitution from the pentaerythritol. Generally the minimum effective temperature for the present process will be about 190° C. The temperature of the reaction mixture should not be raised substantially higher than is necessary to cause the catalytic dehydration to proceed at a satisfactory rate, and should never exceed 290° C.

If the heating is carried out for too long a period of time, it will start a completely new series of chemical reactions which form gaseous and volatile liquid products of penetrating odor and of undesirable color resulting in a final reaction product which is not of the characteristics desired. When the dehydration reaction mixture is held at reaction temperature for such a length of time that a water insoluble yellow oil begins to distill over, the reaction mixture changes in color from a very slight yellow to a brown; and in no case should the reaction be carried on to this extent for the present purpose.

It has been found that rapid conversion of the pentaerythritol starting material to monomeric dehydration products, substantially free of polymers higher than dimers, can be effectuated by raising the temperature of the catalyst-containing reaction mixture to a relatively elevated temperature, which approaches but does not exceed the upper temperature limit of 290° C. Such temperature may comprise, for example, from about 250° C. to about 285° C. The reaction mixture is maintained at such temperature or a temperature in its vicinity until the desired degree of loss of water is produced, and then the application of heat is ceased, and preferably the reaction mixture is cooled, whereby the occurrence of further reaction within the reaction mixture is suppressed.

When the dehydration reaction has once been initiated, it may be advantageous to allow the temperature to recede 10° C., or more, provided the rate of water evolution is maintained. If the temperature is allowed to recede too rapidly, the evolution of water will slow down and a reheating may be necessary to drive out the amount of water necessary to obtain a final product superior to dipentaerythritol in alkyd bodying characteristics. This reheating may produce colored substances and is therefore undesirable.

When temperatures in the lower part of the stated range are used, longer heating times will be employed. To insure the production of dehydration product which is water-soluble, color-free and consists substantially wholly of monomeric dehydration products, the heating will be discontinued when the catalytic dehydration is complete, and before other reactions take place which lead to undesired products. The appearance of the above-mentioned yellow, water-insoluble oil in the distillate may be used as a control in determining the time of heating to be applied at a given temperature. If such oil appears in the distillate, the processing has gone too far.

The amount of water to be driven off in accordance with the present invention will range from about 3% to about 10% by weight of the mixture, and a range of dehydration of from 5% to 7% by weight of the starting material is the most preferable range. When less than 5% by weight of water is driven off, the reaction product produced exhibits less functionality than that equivalent to the condensation dimer of the starting material. Driving off about 5% by weight of water from monopentaerythritol produces a reaction product equivalent to dipentaerythritol in alkyd processing. Products exceeding dipentaerythritol in alkyd processing characteristics can be produced by driving off about 6-8% by weight of water, but when this higher proportion of dehydration is sought in no case should the reaction be carried on to the extent of driving over a yellow water-insoluble oil.

The amount of water evolution is a convenient measure of the extent of dehydration of the mixture, but as will be understood by those skilled in the art, it will be possible to measure the extent of dehydration alternatively with reference to the OH content of the pentaerythritol. In general, I find that a dehydration to the indicated extent gives a finished product of down to about 40% OH content.

The reaction is ordinarily carried on at atmospheric pressure and under an atmosphere of ordinary air. Pressure above or below atmospheric, however, may be used. A stream of inert gas such as carbon dioxide or nitrogen may also be passed through the reaction mixture to carry off the water liberated in the dehydration reaction.

The reaction product upon cooling to room temperature becomes a white solid. It may be used as such, preferably ground to a powder, for purposes such as alkyd manufacture. If desired, undehydrated pentaerythritol may be separated therefrom to produce a novel product of higher epoxy reactivity than the crude reaction product, and particularly useful for polymerization to produce novel polymers, as well as for other purposes. This separation may be accomplished by extraction of the reaction mixture with boiling chloroform in which the epoxy products are soluble but the starting pentaerythritol material will be insoluble.

The invention is illustrated but not limited by the following examples:

EXAMPLE I

This example illustrates preparation of a pentaerythritol dehydration product in accordance with this invention using stannous chloride as a catalyst.

A mixture of 200 grams (g.) of monopentaerythritol and 0.2 g. (approximately 0.1% by weight of the mixture) of stannous chloride dihydrate dissolved in 10 milliliters (ml.) of water is placed in a 1-liter, 3-neck Pyrex flask provided with an electric heating mantel, mechanical stirrer, inclined Liebig condenser to condense and collect the water evolved from the mixture during the processing, and a thermometer. The mixture is heated with stirring. The free or added water, introduced as the stannous chloride carrier, comes over initially. Within 32 minutes the temperature of the reaction mixture has risen to 274.5° C., and water of constitution starts to distill over. Within 11 minutes after this temperature has been reached, 10 ml. of water of constitution has distilled over. The heating is discontinued and the contents of the flask poured out onto a flat surface where it is cooled to solidify it. The solid product is ground in a mortar to pass through an 18 mesh sieve.

The product contains 43% OH and is almost white in color.

EXAMPLE II

This example describes test procedures employed in measuring significant characteristics of the compositions produced in accordance with this invention.

Tall oil formulation

For the measurement of the utility of the pentaerythritol dehydration product in alkyd formation, 20 g. of the reaction product are combined with 61.5 g. of tall oil (Pamak #1, supplied by Hercules Powder Company, Wilmington, Delaware) and 18.5 g. of phthalic anhydride to produce a total of 100 g. of reaction mixture.

The apparatus employed comprises a 1-liter, 3-neck reaction flask provided with a motor-driven stirrer, thermometer, and heater mantel. The flask is connected to a supply of $CO_2$ gas.

The stated mixture of tall oil, phthalic anhydride and the pentaerythritol dehydration product is charged into the flask and stirred, while carbon dioxide is passed through the flask at the rate of 200 cc. per minute. The reaction mixture is meanwhile heated to 450° F. (232.2° C.) over a period of 30 minutes and held at this temperature for 8 hours, under a $CO_2$ atmosphere.

During the run, the progress of the reaction is controlled by measuring the viscosity of a 60% non-volatile solution of the alkyd in mineral spirits in Gardner tubes, at 1-hour intervals.

When reaction is complete, the color of the 60% non-volatile solution in mineral spirits is determined using a Hellige comparator, and the degree of haze, by comparison with samples previously prepared. The acid number of the alkyd is measured by the Gardner method. The mentioned Gardner and Hellige procedures for testing resin properties are well known in the art, and can be found in the usual paint and varnish handbooks by those wishing to obtain a detailed description thereof.

When operating in accordance with the described procedure utilizing commercial dipentaerythritol, the resulting alkyd has the following characteristics:

| | |
|---|---|
| Acid number | Less than 5. |
| Color | 5–9. |
| Viscosity | B–C. |
| Haze | None. |

When the product obtained as described in Example I is employed in this standard tall oil test, the resulting alkyd has a color rating of 5–6, a viscosity of D+, an acid number of 5.3, and excellent clarity.

The viscosity of D+ indicates a greater bodying ability in this product than that corresponding to dipentaerythritol.

*Measurement of color*

For this test, a 10% by weight solution of the total product of the dehydration reaction in warm (50–60° C.) water is placed in a Hellige comparator tube. It is then compared with the Hellige standards, giving results on the same scale as those mentioned above for the determination of the color of the alkyd resin. In general, the color of such solutions will be in the range of from about 4 down to less than 1, indicating a low degree of color for the final pentaerythritol dehydration product.

In certain cases, where an exceptionally low colored pentaerythritol dehydration product is being tested, the 10% solution referred to above is compared to the APHA color standards used in standard water analysis methods. This test procedure is described in the literature.

A 10% by weight solution of the product of Example I has an APHA color in this latter test of less than 500.

EXAMPLE III

The procedure of Example I is repeated using 0.1 g. of stannous chloride dihydrate in place of the 0.2 g. used in the procedure described in that example. The preparation of the dehydration product otherwise proceeds in essentially the same manner as described in Example I. The product is practically identical with that of Example I.

EXAMPLE IV

The procedure of Example I is repeated with the difference that the amount of catalyst used in this run is 0.05 g. of the stannous chloride dihydrate and the reaction temperature is generally about 10° C. higher. The resulting product is essentially identical with that of Example I.

EXAMPLE V

Proceeding substantially as described in Example I, a mechanical mixture of 200 g. of monopentaerythritol with a solution of 0.4 g. (approximately 0.2% by weight of the mixture) of magnesium chloride hexahydrate dissolved in 15 ml. of water is prepared and heated to 274° C. Rapid evolution of water occurs at this temperature, and the temperature is allowed to drop down to 262° C. A total of 26 ml. of water is driven off. The color of the reaction product is almost white with a slight tinge of yellow.

In several duplications with slight variations of this technique, the OH content of the finished product remains in the range of from 42 to 43.6% OH.

The alkyd made from this product by the standard alkyd test described above in Example II is a clear resin of C+ viscosity, thus indicating that this pentaerythritol dehydration product has a greater bodying ability than that corresponding to dipentaerythritol.

EXAMPLE VI

In similar runs using 0.1%, 0.05%, and 0.025% of magnesium chloride hexahydrate, results similar to those of the preceding example are obtained. In these experiments, temperatures as high as 274.5° C. and as low as 252° C. produce evolution of water of constitution without causing significant side reactions.

EXAMPLE VII

A mixture of 1330 g. of pure monopentaerythritol and 0.67 g. of magnesium bromide hexahydrate is processed essentially as described in Example I until water equal to 6% by weight of the mixture is driven over. In this case, no additional solvent water is added, and the loss of weight of a total of 80 g. of water is due entirely to liberation of water of constitution. The water is driven over within 29 minutes at a reacting temperature of 190–248° C.

When used in the standard tall oil alkyd test described in Example II, the color of the 60% non-volatile solution is 6 and the viscosity of this alkyd is D, which is higher than that produced by dipentaerythritol, where the alkyd has a viscosity of B–C.

EXAMPLE VIII

This example illustrates the criticality of the dehydration catalyst concentration.

The procedure described in Example I and V is followed, the temperature of the mixture of monopentaerythritol and catalyst being raised initially to about 274° C. The catalyst concentration employed however, is 0.3% by weight. The dehydration product is not free of polymer, and an alkyd produced from the dehydration product is not clear, but contains a haze.

EXAMPLE IX

This example illustrates the applicability of the process of the invention to polypentaerythritols.

Dipentaerythritol is substituted, on a pound-for-pound basis, for the monopentaerythritol used in the procedure set forth in the first paragraph of Example V. There is obtained a reaction product which, when used in the standard tall oil alkyd test described in Example II, bodies the alkyd to a U+ viscosity. The greater viscosity is produced because of the higher proportion of OH groups in the starting material selected here.

Tripentaerythritol can similarly be converted by the process of this invention to a product of enhanced bodying power.

While the invention has been described with reference to various particular preferred embodiments thereof, it will be appreciated that variations and alterations in the modes of procedure described can be made within the scope of the appended claims.

What is claimed is:

1. The method of the dehydration of a pentaerythritol to provide a completely water-soluble, low molecular weight dehydration product of enhanced bodying power which is substantially free of aldehydic and double bond material which comprises heating a mixture of a pentaerythritol selected from the class consisting of monopentaerythritol, dipentaerythritol, and tripentaerythritol with a catalyst selected from the class consisting of stannous chloride, magnesium chloride, and magnesium bromide, in a proportion of from about 0.01% to not exceeding 0.25% by weight of the mixture, calculated on the weight of the said catalyst as the hydrate thereof, to a temperature below about 290° C., effective to liberate water of constitution of the said pentaerythritol until said water of constitution in an amount of from about 3% to about 10% by weight of the mixture has been evolved from said mixture.

2. The method of claim 1 wherein said catalyst is magnesium chloride, employed as the hexahydrate.

3. The method of claim 1 wherein the amount of water of constitution of the said pentaerythritol liberated is between about 5% and about 7% by weight of the mixture.

4. The method of claim 1 wherein said pentaerythritol is monopentaerythritol.

5. The method for the dehydration of a pentaerythritol to provide a completely water-soluble, low molecular weight dehydration product of enhanced bodying power which is substantially free of aldehydic and double bond material which comprises heating a mixture of a pentaerythritol selected from the class consisting of monopentaerythritol, dipentaerythritol, and tripentaerythritol with from not exceeding 0.025% to about 0.25%, by weight of the mixture, of magnesium chloride hexahydrate, to a temperature, below about 290° C., effective to produce rapid liberation of water of constituion of said pentaerythritol, allowing the temperature of said mixture to recede while maintaining said temperature sufficiently high to maintain substantially the same rate of liberation of water from the mixture, until from about 5% to about 7%, by weight of the mixture, of said water of constitution has been evolved, and then cooling the reaction mixture.

6. The method of claim 5 wherein said pentaerythritol is monopentaerythritol.

7. The product of the process of claim 1.

References Cited in the file of this patent

UNITED STATES PATENTS

| | | |
|---|---|---|
| 2,462,047 | Wyler | Feb. 15, 1949 |
| 2,462,048 | Wyler | Feb. 15, 1949 |
| 2,462,049 | Wyler | Feb. 15, 1949 |
| 2,465,776 | Wyler | Mar. 29, 1949 |
| 2,468,722 | Wyler | Apr. 26, 1949 |
| 2,651,663 | Marrian et al. | Sept. 8, 1953 |

UNITED STATES PATENT OFFICE
CERTIFICATION OF CORRECTION

Patent No. 3,000,901                                            September 19, 1961

Joseph A. Wyler

It is hereby certified that error appears in the above numbered patent requiring correction and that the said Letters Patent should read as corrected below.

Column 1, lines 51 to 53, the formula should appear as shown below instead of as in the patent:

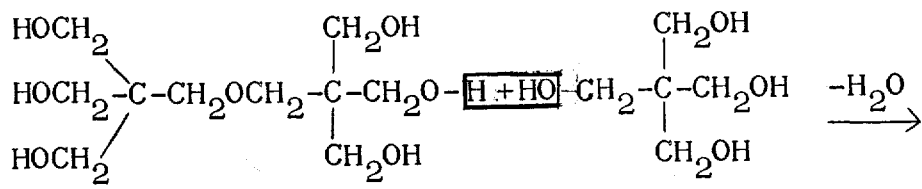

column 3, the first formula appearing between lines 72 and 75 should appear as shown below instead of as in the patent:

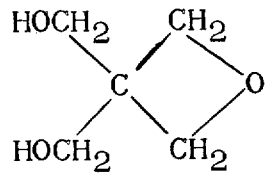

Signed and sealed this 5th day of June 1962.

(SEAL)
Attest:

ERNEST W. SWIDER                                      DAVID L. LADD
Attesting Officer                                           Commissioner of Patents